Oct. 19, 1948.　　F. G. G. ARMSTRONG　　2,451,707
VALVE ARRANGEMENT
Filed March 14, 1944
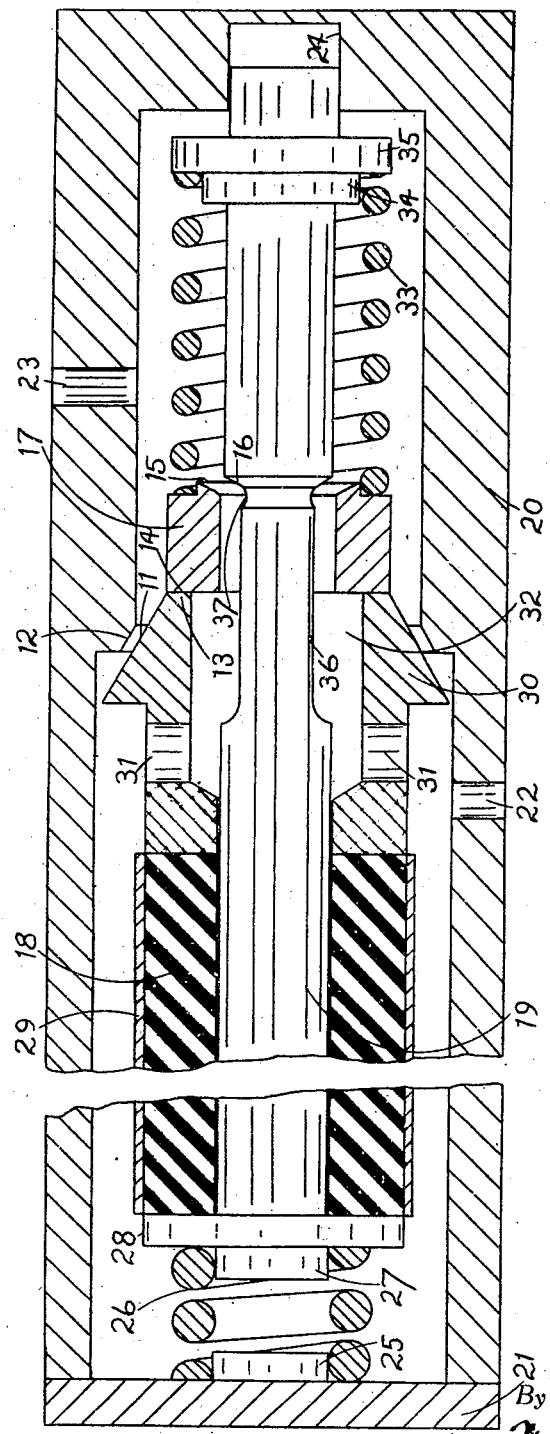
Inventor
F.G.G. Armstrong
By
Mason, Porter & Diller
Attorneys Patented Oct. 19, 1948

2,451,707

UNITED STATES PATENT OFFICE 2,451,707

VALVE ARRANGEMENT

Fullerton George Gordon Armstrong, Molescroft, Beverley, England

Application March 14, 1944, Serial No. 526,425
In Great Britain January 28, 1944

1 Claim. (Cl. 236—93)

This invention concerns means for checking the flow of fluid in a hydraulic circuit.

One object of this invention is to provide a relatively simple and compact valve arrangement, especially suitable for use in vehicle shock absorber constructions, which includes two oppositely acting pressure release valve and an independent leak orifice together with a single thermal responsible element for varying both said valves and said orifice in accordance with temperature changes.

The aforesaid and other objects will become apparent from the following description with reference to the drawing annexed hereunto.

In the drawing there is shown in longitudinal section one form of construction.

An assembly of two oppositely acting pressure release valves for controlling the flow of fluid, is formed by a hollow casing 20, 21 internally divided into two parts by a valve seat 12 defining a port. Each part of the casing has a connection 22 or 23 for fluid into said part. A spindle 19 having an abutment 28 and a leak orifice defining surface 37 thereon extends from one part of the casing into the other part thereof, wherein it is slidable in a bore 24. A member 30 has a valve head complementary to the valve seat 12 aforesaid and has a valve seat 13 coaxially formed with respect to said head. This member 30 has an axial counterbore 32 and a radial bore 31, said two bores constituting means to conduct fluid through the member to the valve seat 13 thereof. The member 30 has an axial bore slightly larger in diameter than spindle 19 so that the member 30 may be carried by and displaceable along the spindle. A thermal responsive tubular element 18 having a coefficient of thermal expansion different from that of said casing and from that of said spindle surrounding the spindle, is arranged with its ends respectively in contact with said abutment 28 and said member 30. An element 17 is displaceable along said spindle 19 and has a valve head 14 complementary to the valve seat 13 on member 30 and has a leak orifice defining surface 15 coacting with the leak orifice defining surface 16 of the spindle to define a leak orifice between said casing parts at least whilst element 17 is in contact with the said member 30. A spring 33 carried by the spindle urges element 17 along spindle 19 towards valve seat 13 on member 30 whereby the pressure exerted by the spring 33 on element 17 when this element and member 30 are in any given relative position is varied in accordance with temperature. Likewise the leak orifice is varied in size in accordance with temperature whilst element 17 is in contact with member 30. A second spring 26 having its opposite ends respectively engaged on an inward projection 25 of the casing and an extension 27 of spindle 19 acts between the casing and the spindle urging spindle 19 together with the thermal responsive element 18 and member 30 towards a position wherein member 30 makes contact with the valve seat 12 in the casing whereby the pressure exerted by the second spring 26 on the spindle when the valve head of said member and the valve seat of the casing are in any given relative position is varied in accordance with temperature.

In operation, if the fluid pressure in a line connected to port 23 exceeds the pressure obtaining in a line connected to port 22 by an amount sufficient to compress spring 26 the conical valve surfaces 11 (on the head 30) and 12 (the seating formed in the casing) will separate and fluid will pass from port 23 to port 22 by way of the pressure release valve 11, 12, the position of the parts being substantially as shown in the drawing.

If the pressure in the line connected to port 22 is greater than that in the other line, however, by an amount sufficient to effect compression of the spring 33 the surfaces 13 (on the head 30) and 14 (on element 17) will separate, valve 11, 12 being closed. Fluid will thus flow from port 22 through radial bores 31, counterbore 32, between surfaces 13 and 14 to port 23.

If a nearly equal pressure obtains in each line both valves would be closed.

In my prior Patent Number 2,371,122 I have compensated for the greater viscosity of fluids by arranging means for keeping the conical valve slightly open, to a greater extent the lower the temperature, thereby providing a leakage orifice for small quantities of fluid to pass in either direction. The size of the independent leak orifice of the present invention is varied as the temperature changes because of the different coefficients of thermal expansion of the hard rubber tube 18 and spindle 19.

For example, if the temperature rises spindle 19 and tube 18 will both expand, but the tube will expand to a greater extent than will the spindle, and assuming valve 11, 12 to be closed spring 26 will be compressed thereby pressing surfaces 11 and 12 together with greater force, and consequently raising the force required to open valve 11, 12.

A similar increase of compressive force will be transmitted to spring 33 thereby reacting on valve 13, 14 and requiring a greater force to open the same.

Simultaneously with these increases in spring compression the displacement of element 17 towards spring 33 will cause an approach of surface 15 on this element towards surface 16 on the spindle thereby reducing the size of the independent leak orifice 15, 16.

Fluid can pass through this orifice in either direction as from port 23 between surfaces 15, 16 around circumferential groove 37, over the flats 36 into the counterbore 32, through radial bores 31 to port 22 or vice versa.

This construction in accordance with the present invention, although of particular value when used for checking the flow of oil in vehicle shock absorbers may of course be used for numerous purposes not specifically referred to: furthermore whilst the hard rubber tube 18 with rigid support 29 is of considerable value it does not form an essential part of the valve arrangement and other materials may of course be employed.

I declare that what I claim is:

An assembly of two oppositely acting pressure release valves for controlling the flow of fluid, comprising in combination a hollow casing internally divided into two parts by a valve seat defining a port and having a connection for fluid into each of said parts, a spindle having an abutment and a leak orifice defining surface thereon extending from one part of the casing into the other part thereof, a member having a valve head complementary to the valve seat aforesaid and a valve seat coaxially formed on the member with respect to said head with means to conduct fluid through the member to the valve seat thereof carried by and displaceable along the spindle, a thermal responsive tubular element having a coefficient of thermal expansion different from that of said casing and from that of said spindle surrounding the spindle and having its ends respectively in contact with said abutment and said member, an element displaceable along said spindle having a valve head complementary to the valve seat on said member and having a leak orifice defining surface coacting with the aforementioned leak orifice defining surface of the spindle to define a leak orifice between said casing parts at least whilst the said valve element is in contact with the said member, spring means carried by the spindle urging said valve element along the spindle towards the valve seat on said member whereby the pressure exerted by the said spring means on said valve element when said valve element and said member are in any given relative position is varied in accordance with temperature and likewise the leak orifice is varied in size in accordance with temperature whilst the said valve element is in contact with the said member, and a second spring means acting between the casing and the spindle urging the spindle together with the thermal responsive element and said member towards a position wherein said member makes contact with the valve seat in the casing whereby the pressure exerted by the second spring means on the spindle when the valve head of said member and the valve seat of the casing are in any given relative position is varied in accordance with temperature.

FULLERTON GEORGE
GORDON ARMSTRONG.

REFERENCES CITED

The following references are of record in the file of this patent:

UNITED STATES PATENTS

| Number | Name | Date |
|---|---|---|
| 1,371,277 | Udale | Mar. 15, 1921 |
| 1,472,412 | Goosmann | Oct. 30, 1923 |
| 1,828,446 | Rossman | Oct. 20, 1931 |
| 1,952,683 | Reseh et al. | Mar. 27, 1934 |
| 2,371,122 | Armstrong | Mar. 13, 1945 |

FOREIGN PATENTS

| Number | Country | Date |
|---|---|---|
| 345,050 | France | Sept. 28, 1904 |
| 560,548 | Great Britain | Apr. 7, 1944 |